(12) United States Patent
Shimoyama et al.

(10) Patent No.: US 8,294,310 B2
(45) Date of Patent: Oct. 23, 2012

(54) MOTOR WITH REDUCTION GEAR MECHANISM

(75) Inventors: Masayuki Shimoyama, Chigasaki (JP); Hirokazu Shoda, Isesaki (JP); Yasuo Ohashi, Yokohama (JP)

(73) Assignee: Mitsuba Corporation, Kiryu-shi (JP)

( * ) Notice: Subject to any disclaimer, the term of this patent is extended or adjusted under 35 U.S.C. 154(b) by 374 days.

(21) Appl. No.: 12/666,049

(22) PCT Filed: Jul. 22, 2008

(86) PCT No.: PCT/JP2008/063133
§ 371 (c)(1),
(2), (4) Date: Dec. 22, 2009

(87) PCT Pub. No.: WO2009/022524
PCT Pub. Date: Feb. 19, 2009

(65) Prior Publication Data
US 2011/0006627 A1 Jan. 13, 2011

(30) Foreign Application Priority Data

Jul. 24, 2007 (JP) ................................. 2007-192515
Mar. 28, 2008 (JP) ................................. 2008-085807

(51) Int. Cl.
*H02K 7/116* (2006.01)
(52) U.S. Cl. ........................ 310/83; 310/49.47
(58) Field of Classification Search ................ 310/75 R, 310/83, 99, 49, 47; 74/460, 462, 425, DIG. 10
See application file for complete search history.

(56) References Cited

U.S. PATENT DOCUMENTS

| | | | | |
|---|---|---|---|---|
| 3,895,700 A | * | 7/1975 | Kerr | 192/41 R |
| 4,615,230 A | * | 10/1986 | Guichard | 74/427 |
| 4,789,761 A | * | 12/1988 | Malone et al. | 200/38 C |
| 5,446,326 A | * | 8/1995 | Scheider | 310/83 |
| 6,099,487 A | * | 8/2000 | Chen | 601/90 |
| 6,858,951 B2 | * | 2/2005 | Liao | 290/1 C |
| 2002/0140302 A1 | * | 10/2002 | Hsu | 310/75 R |
| 2005/0115350 A1 | * | 6/2005 | Ohashi et al. | 74/425 |
| 2005/0194852 A1 | * | 9/2005 | Liao | 310/99 |
| 2006/0060457 A1 | * | 3/2006 | Bendo | 200/61.54 |
| 2006/0181161 A1 | * | 8/2006 | Kawamoto et al. | 310/51 |
| 2007/0049453 A1 | * | 3/2007 | Nagai et al. | 475/254 |

FOREIGN PATENT DOCUMENTS

EP 1529984 A2 * 5/2005

(Continued)

*Primary Examiner* — Quyen Leung
*Assistant Examiner* — Naishadh Desai
(74) *Attorney, Agent, or Firm* — Kratz, Quintos & Hanson, LLP

(57) ABSTRACT

A motor 10 with reduction gear mechanism has a first worm 15 and a second worm 15' having mutually opposite screw torsion directions; a first counter gear 30 including a first large-diameter gear 31 meshing with the first worm 15 and a first small-diameter gear 35 rotating as one piece with the first large-diameter gear 31; a second counter gear 30' including a second large-diameter gear 31' meshing with the second worm 15' and a second small-diameter gear 35' rotating as one piece with the second large-diameter gear 31'; and an output gear 40 meshing with both the small-diameter gears 35, 35'; wherein a first device 50 for applying a force to press the first counter gear 30 towards a gear case 21 is arranged between the tip of the first small-diameter gear 35 and a gear case cover 29, and a second device 50' for applying a force to press the second counter gear 30' towards the gear case 21 is arranged between the tip of the second small-diameter gear 35' and the gear case cover 29.

20 Claims, 10 Drawing Sheets

FOREIGN PATENT DOCUMENTS

| | | |
|---|---|---|
| JP | 59-88549 | 6/1984 |
| JP | 9-175334 | 7/1997 |
| JP | 2001-171531 A1 | 6/2001 |
| JP | 2003-4105 A1 | 1/2003 |
| JP | 2006-187177 A1 | 7/2006 |

* cited by examiner

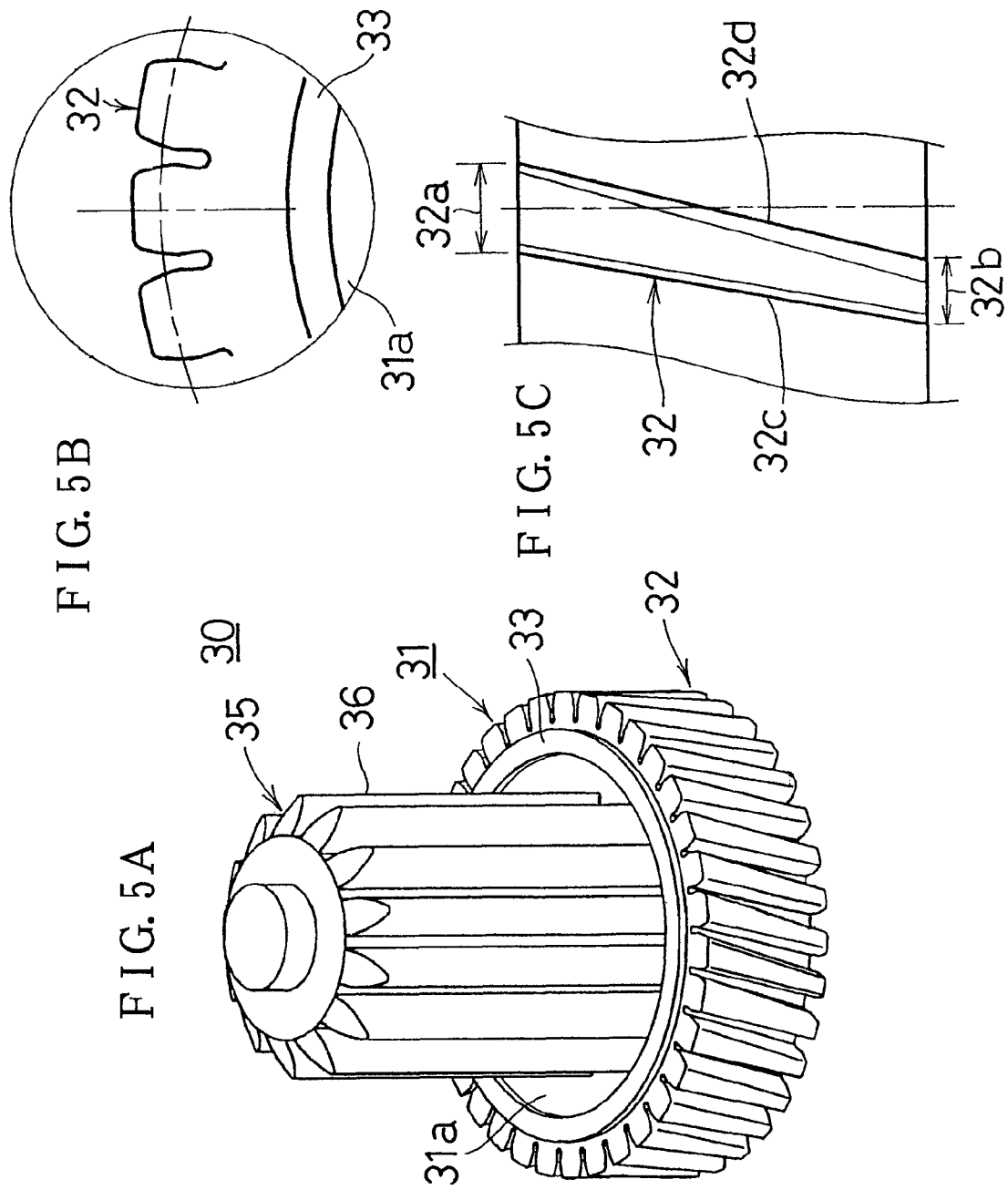

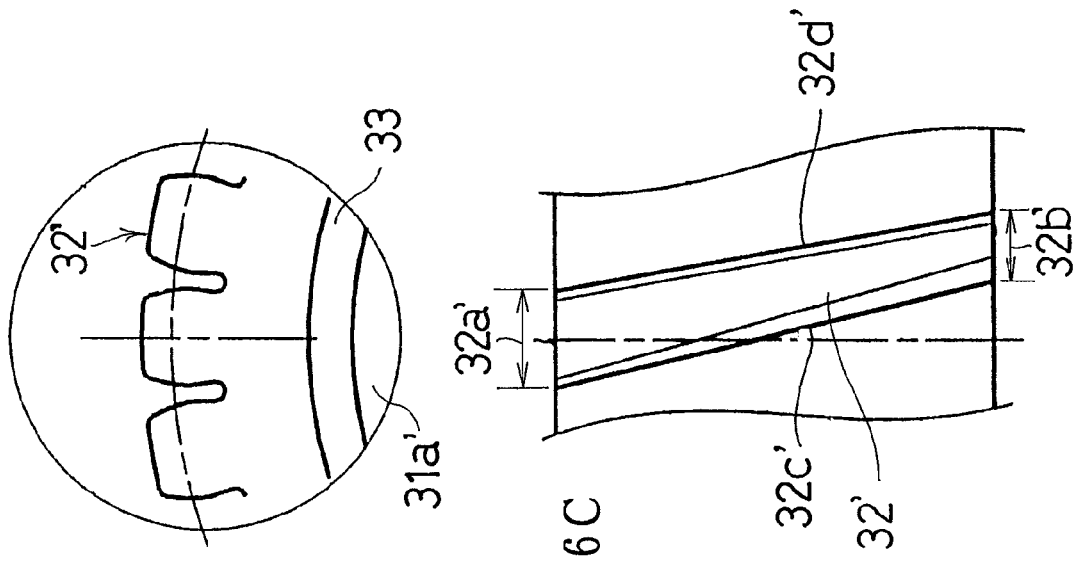
FIG. 6B
FIG. 6C
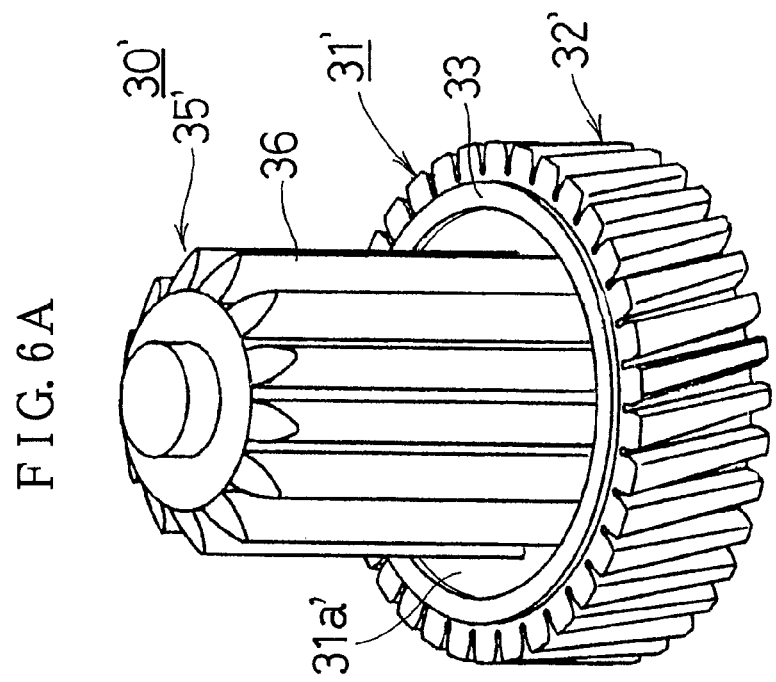
FIG. 6A

MOTOR WITH REDUCTION GEAR MECHANISM

TECHNICAL FIELD

The present invention relates to a motor with reduction gear mechanism.

This invention for example relates to a motor with reduction gear mechanism ideal for use in automotive wiper motors and power window motors, etc.

BACKGROUND ART

This type of motor with reduction gear mechanism utilized as a wiper motor contains a motor shaft supported to allow free rotation in a motor case and a gear case; a pair of worms formed in the vicinity of one end of the motor shaft within the gear case and with mutually opposite screw torsion directions; a pair of counter gears disposed on both sides of the motor shaft, and including large-diameter gears meshing with the worms respectively, and small-diameter gears having the same axis as the large-diameter gear to rotate as one piece; and an output gear meshing with each small-diameter gear of the pair of counter gears (For example, see the patent document 1)

This wiper motor contains a two-stage reduction gear mechanism in which a pair of counter gears mesh with a pair of worms formed with mutually opposite screw torsion directions. Therefore, the direction of the thrust load generated by the combination of one of worms and counter gear becomes opposite to the direction of the thrust load generated by the combination of the other of worms and counter gear so that the thrust loads are cancelled out. Thus, along with making a high-accuracy and strong thrust bearing unnecessary, the play in the motor shaft is eliminated and the wiper motor rotation is smooth.

Patent document 1: Japanese Patent Non-examined Publication No. 9-175334

DISCLOSURE OF INVENTION

Problem to be Solved by Invention

Even in wiper motors in which counter gears mesh with a pair of worms whose screw torsion directions are mutually opposite, there is a backlash between the worm and the counter gear so that an abnormal sound is generated during the inverse load from the inertial force that accompanies reversal motion of the wiper arm.

An object of the present invention is to provide a motor with reduction gear mechanism capable of inhibiting or suppressing backlash between the worm and the counter gear.

Means for Solving Problem

Representative aspects among the means for resolving the aforementioned problem are described next.

A motor with reduction gear mechanism comprising:
a yoke formed with a bottom and an opening on one end,
a magnet fixed to the inner circumferential side of the yoke,
an armature arranged on the inner side of the magnet,
a rotating shaft fixed to the armature and including a first worm and a second worm having mutually opposite screw torsion directions,
a gear case connected to the opening of the yoke and supporting the rotating shaft to allow free rotation and having a reduction gear mechanism storage section with a bottom to accommodate a reduction gear mechanism,
a gear case cover to cover the opening of the gear case,
a first counter gear with multiple first teeth having the teeth thickness on the gear case cover side of the first teeth larger than the teeth thickness on the gear case bottom side,
a second counter gear with multiple second teeth having the teeth thickness on the gear case cover side of the second teeth larger than the teeth thickness on the gear case bottom side, and
an output gear containing an output shaft and meshing with the first small-diameter gear and the second small-diameter gear.

Effect of Invention

In the motor with reduction gear mechanism as described above, the back tooth surfaces of the first large-diameter gear and the second large-diameter gear are in constant close contact with the back tooth surfaces of the first worm and the second worm so that backlash between the worm and the counter gear can be inhibited or suppressed.

BRIEF DESCRIPTION OF DRAWINGS

FIG. 4A is a plan view; FIG. 4B is a longitudinal cross sectional view;

FIGS. 5A, 5B and 5C are drawings showing the first counter gear; FIG. 5A is a perspective view; FIG. 5B is a transverse cross sectional view showing the first tooth; FIG. 5C is a development view showing the first tooth;

FIGS. 6A, 6B and 6C are drawings showing the second counter gear; FIG. 6A is a perspective view; FIG. 6B is a transverse cross sectional view showing the second tooth; FIG. 6C is a development view showing the second tooth;

FIG. 8A is a frontal cross sectional view; FIG. 8B is a bottom view; FIG. 8C is a cross sectional view taken along a line c-c of FIG. 8A; FIG. 8D is a cross sectional view taken along a line d-d of FIG. 8A; FIG. 8E is a pattern diagram for describing the effect of the component force;

FIG. 9A is a perspective view of the first counter gear utilized in that motor; FIG. 9B is a longitudinal cross sectional view equivalent to FIG. 4B;

FIG. 10A is a perspective view of the first counter gear utilized in that motor; FIG. 10B is a longitudinal cross sectional view equivalent to FIG. 4B.

BEST MODE FOR CARRYING OUT THE INVENTION

Figure 1:
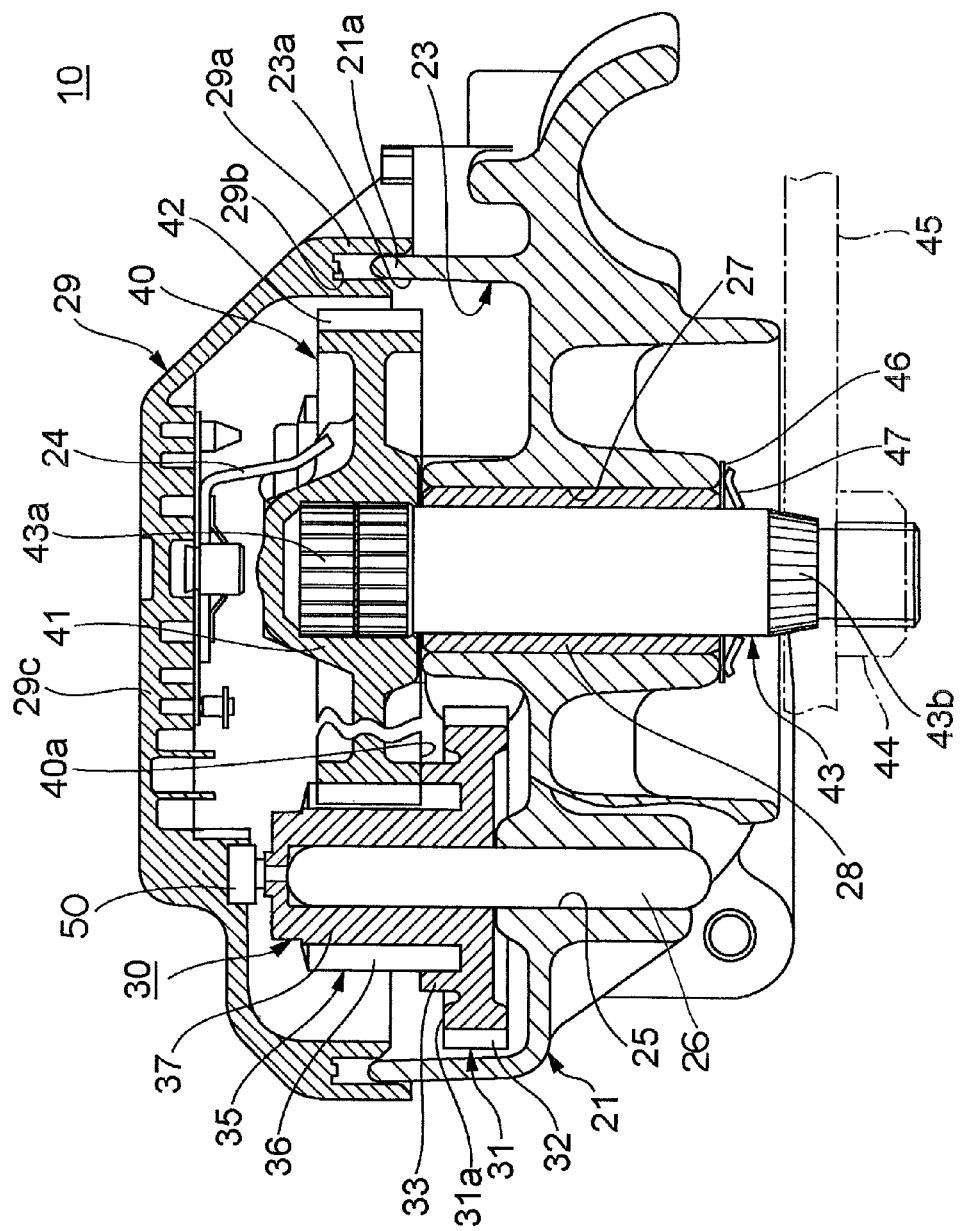
FIG. 1 is a longitudinal cross sectional view showing the motor with reduction gear mechanism of an embodiment of the present invention.

An embodiment of the present invention is described next while referring to the drawings.

In this embodiment, the motor with reduction gear mechanism of the present invention is structured as a wiper motor.

Figure 2:
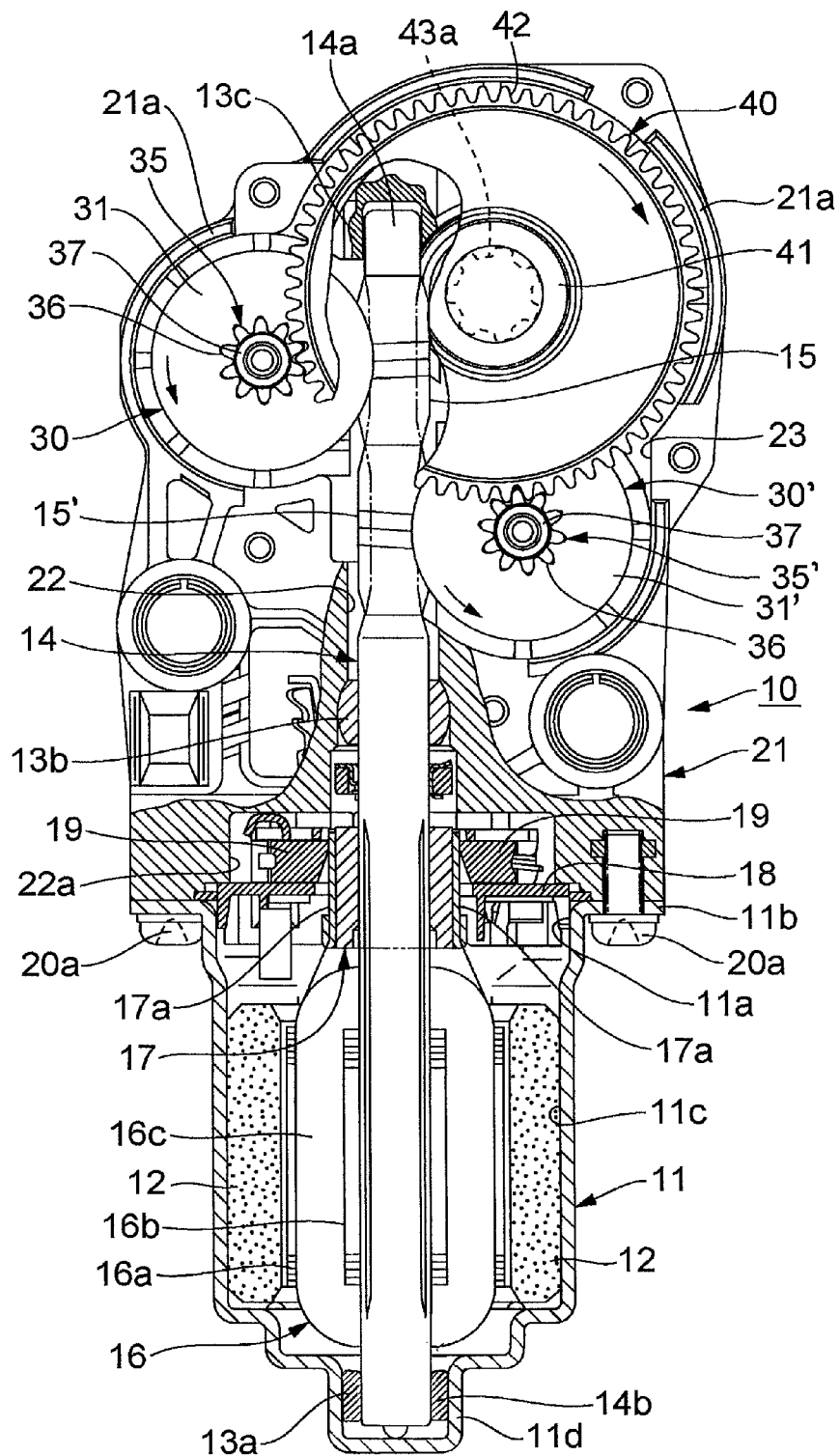
FIG. 2 is a transverse cross sectional view of that motor.
Figure 3:
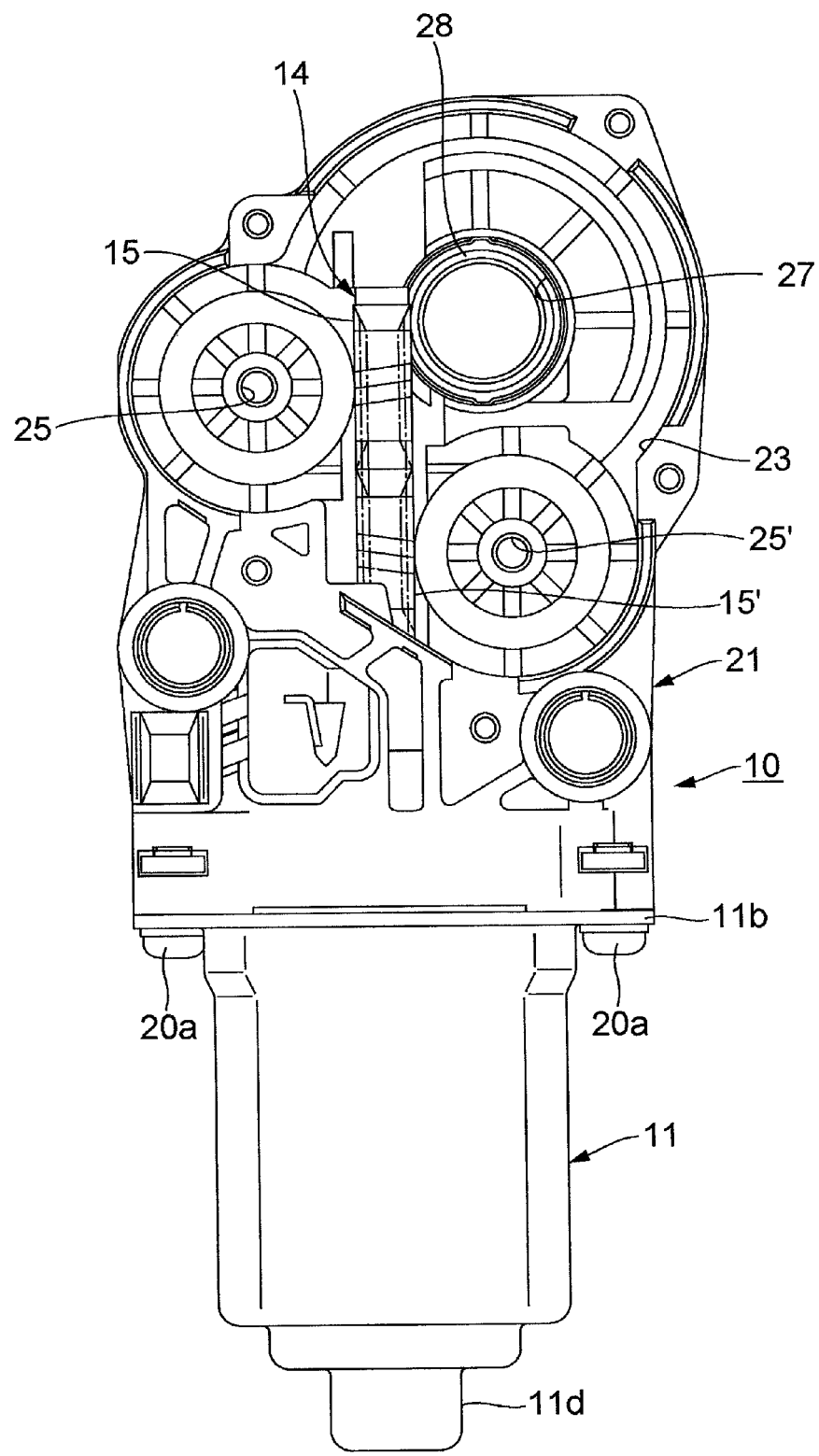
FIG. 3 is a plan view showing the state where the gear case cover, etc. is removed in that motor.

As shown in FIG. 1 through FIG. 3, a wiper motor 10 of this embodiment includes an approximately cylindrical shaped yoke 11 made of metal and open on one end, an aluminum die cast gear case 21 joined by screws 20A to a flange 11b on an open section 11a of the yoke 11, and a synthetic resin gear case cover 29 for covering an open section 23a of a reduction gear mechanism storage section 23 of the gear case 21.

The gear case of this embodiment is made by aluminum die casting. However, a gear case made of synthetic resin may be used.

As shown in FIG. 2, a pair of magnets 12, 12 are fastened by adhesive, etc. to the inner circumferential surface 11c of the yoke 11. A radial bearing 13a fitted into the cylinder section 11d with a bottom on the other end of the yoke 11, and radial bearings 13b, 13c fitted in the vicinity of both edges of an axial hole 22 of the gear case 21 support an armature shaft (motor shaft) 14 serving as a rotating shaft to allow free rotation.

A first worm 15 and a second worm 15' with mutually opposite screw torsion directions are formed in the vicinity of the tip 14a of the armature shaft 14.

An armature 16 containing the armature shaft 14 is installed between the pair of magnets 12, 12. The armature 16 is clamped in the vicinity of the base end 14b of the armature shaft 14. The armature 16 is made up of an armature core 16a containing coil winding sections 16b with a specified number of slots, and an armature coil 16c wound on the coil winding section 16b of the armature core 16a.

A commutator 17 is clamped to the armature shaft 14 at a position facing the boundary of the gear case 21 and the yoke 11. The commutator 17 contains the same number of commutator segments (segments) 17a as the coil winding sections 16b of the armature core 16a. The commutator segments 17a are electrically connected to the armature coils 16c respectively.

The open end of the axial hole 22 of the gear case 21 forms a large-diameter hole 22a. A pair of brushes 19, 19 are installed by way of holders 18 at positions facing the commutator 17 in the large-diameter hole 22a so as to make contact with the commutator segments 17a.

Electrical current flows in the armature coil 16c, etc. and the armature shaft 14 rotates when a switch of the wiper not shown in the drawings is switched to on.

The axial hole 22 is formed in approximately the center of the gear case 21 as shown in FIG. 2 and FIG. 3. The reduction gear mechanism storage section 23 is formed in a concave shape connecting to the axial hole 22.

A first hole 25 and a second hole 25' are formed in a cylindrical shape at specified positions on both sides of the first worm 15 and the second worm 15' on the bottom wall of the reduction gear mechanism storage section 23.

As shown in FIG. 1, the lower sections of pin-shaped shafts 26 made of metal are fitted by press-fit insertion or other methods into the first hole 25 and the second hole 25'. A first counter gear 30 and a second counter gear 30' are respectively supported on the shafts 26 to allow free rotation.

A circular hole 27 is formed at a position on the right side of the tip of the first worm 15 in FIG. 3 on the bottom wall of the reduction gear mechanism storage section 23. The circular hole 27 contains a cylindrical shaped radial bearing 28 made of sintered metal. The radial bearing 28 supports an output shaft 43 to allow free rotation.

As shown in FIG. 1, the upper end section 43a of the output shaft 43 is fixed into a cylindrical section 41 at the center of an output gear 40 by insertion molding. A wiper link 45 is joined by way of a nut 44 to the lower end section 43b protruding to the outer side from the gear case 21 on the output shaft 43.

While in a state where the lower surface 40a of the output gear 40 having the upper end section 43a of the output shaft 43 fixed by insertion molding, contacts the upper surface of the radial bearing 28, a push-nut 47 is inserted by way of a flat washer 46 from the lower section of the output shaft 43 until the flat washer 46 makes contact with the lower surface of the radial bearing 28. The output shaft 43 and the output gear 40 are in this way respectively prevented from moving along the axis.

The above described pair of worms 15, 15', and pair of counter gears 30, 30', and output gear 40 are stored in the reduction gear mechanism storage section 23 of the gear case 21, and constitute a two-stage reduction gear mechanism.

An open section 23a on one end side of the reduction gear mechanism storage section 23 of the gear case 21 as shown in FIG. 1, is covered by the gear case cover 29 made from synthetic resin. A concave section 29b is formed at the center of the lower surface of a ring-shaped side wall 29a of the gear case cover 29. The concave section 29b fits into the peripheral wall section 21a of the gear case 21.

A contact plate 24 is installed on the lower surface of a ceiling section 29c of the gear case cover 29.

The first counter gear 30 as shown in FIGS. 4A and 4B and FIGS. 5A, 5B and 5C is formed from synthetic resin. The first counter gear 30 includes a first large-diameter gear 31 formed with multiple first teeth 32 meshing with the first worm 15, and a first small-diameter gear 35 with the same axis as the first large-diameter gear 31 for rotating as one piece.

The first large-diameter gear 31 is formed as a helical gear. The teeth thickness 32a on the gear case cover side on the first teeth 32 is formed larger than the teeth thickness 32b on the gear case bottom side. In other words, the first teeth 32 of the first large-diameter gear 31 possess different leads along the tooth trace on the front tooth surface 32c side meshing with the first worm 15 and on the back tooth surface 32d side.

A slide section 33 is formed as one piece in the vicinity of the gear mesh pitch circle of the upper surface 31a on the first large-diameter gear 31 so that the output gear 40 receives the thrust component force along the axis of the first counter gear 30. The slide section 33 is formed as one piece in a protruding ring shape to make contact and slide in the vicinity of the gear mesh pitch circle of the lower surface 40a of the output gear 40 (See FIG. 1).

The first small-diameter gear 35 is formed as a spur gear. The teeth 36 of the first small-diameter gear 35 mesh with the teeth 42 of the output gear 40.

A cylindrical section 37 is formed in the center of the first small-diameter gear 35. The cylindrical section 37 fits onto the shaft 26 to allow free sliding movement. The first counter gear 30 is in this way supported to freely rotate on the shaft 26.

As shown in FIGS. 4A and 4B and FIGS. 6A, 6B and 6C, the second counter gear 30' is formed from synthetic resin. The second counter gear 30' includes a second large-diameter gear 31' formed with multiple second teeth 32' meshing with the second worm 15', and a second small-diameter gear 35' with the same axis as the second large-diameter gear 31' for rotating as one piece.

The second large-diameter gear 31' is also formed as a helical gear. The teeth thickness 32a' on the gear case cover side on the second teeth 32' is formed larger than the teeth thickness 32b' on the gear case bottom side. In other words, the second teeth 32' of the second large-diameter gear 31' possess different leads along the tooth trace on the front tooth surface 32c' side meshing with the second worm 15' and on the back tooth surface 32d' side.

The slide section 33, the teeth 36, and the cylindrical section 37 are the same structure as for the first counter gear 30 so the same reference numerals are assigned and a description is omitted.

Figure 4A:
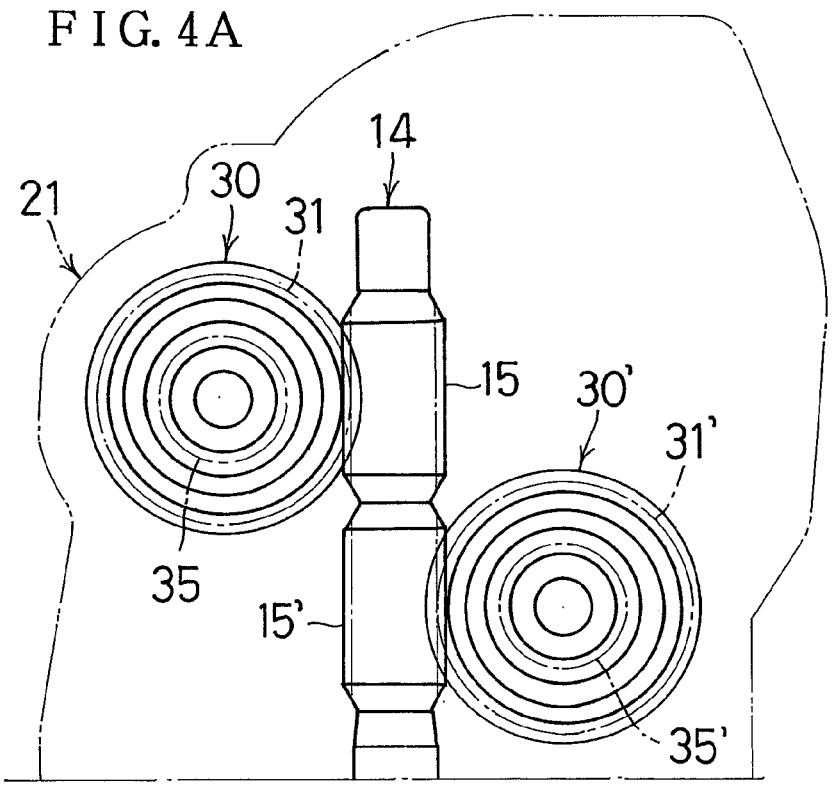
FIGS. 4A and 4B are drawings showing the worm and counter gear placement.
Figure 4B:
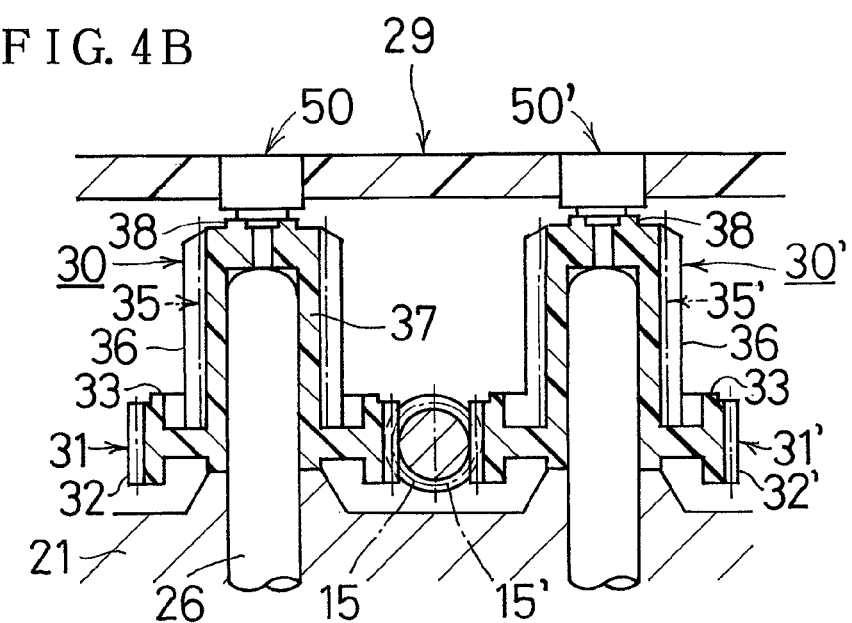

As shown in FIGS. 4A and 4B, a first device for applying a force 50 is mounted between the tip of the first small-diameter gear 35 of the first counter gear 30 and the gear case cover 29 for applying a force so as to press the first counter gear 30 towards the gear case 21.

A second device for applying a force 50' is likewise mounted between the tip of the second small-diameter gear 35' of the second counter gear 30' and the gear case cover 29 for applying a force so as to press the second counter gear 30' towards the gear case 21.

Figure 7:
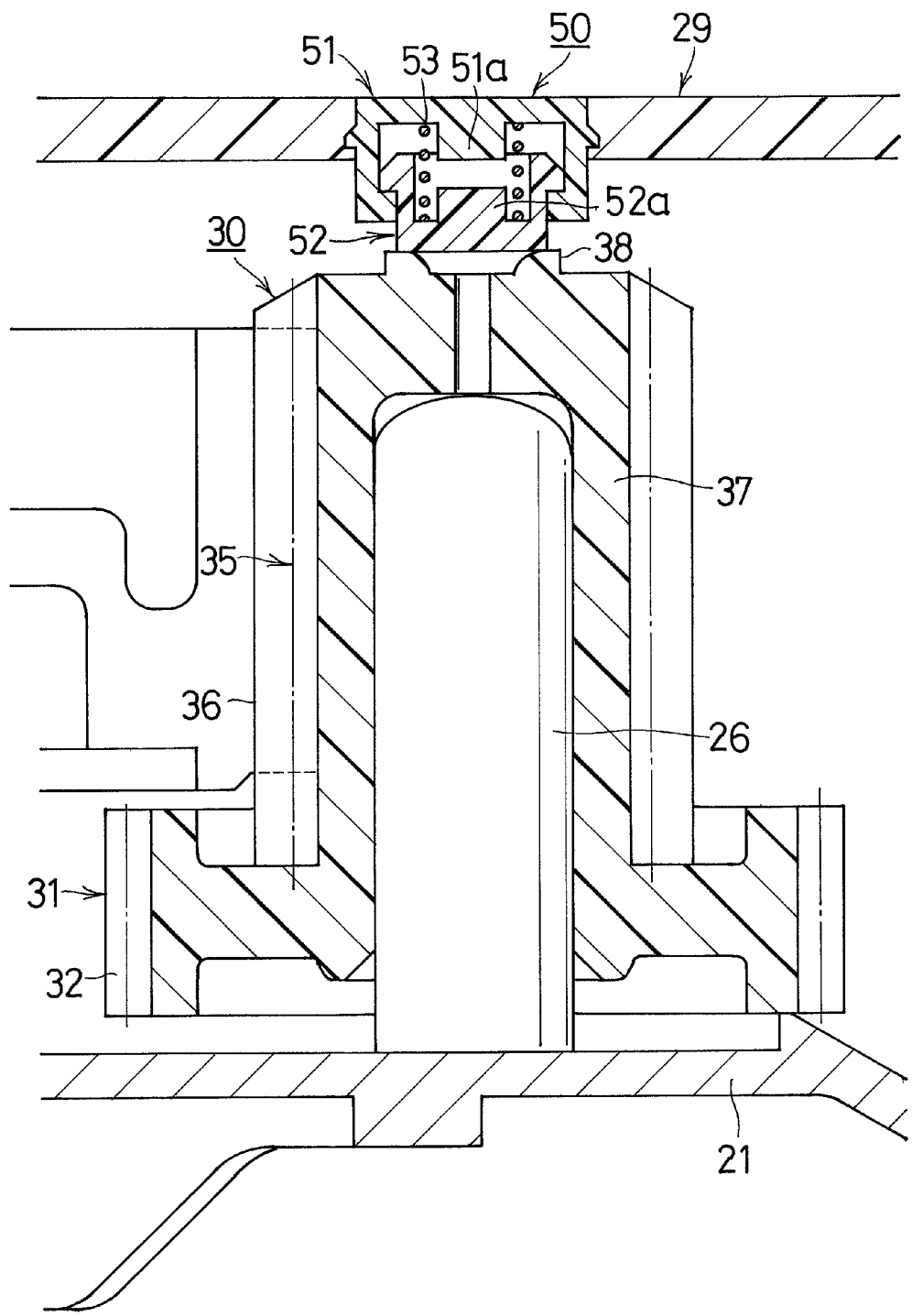
FIG. 7 is a longitudinal cross sectional view showing the device for applying a force.

The first device 50 and the second device 50' are essentially the same structure so a description is given using the first device as a typical example in FIG. 7.

The first device 50 as shown in FIG. 7 contains a case 51. The case 51 is formed in a cylindrical shape closed on one end (hereafter, set as the upper surface). The case 51 is fixed to the gear case cover 29 concentrically along the line extending from the center of the first counter gear 30. The approximate upper-half of a slide member 52 is inserted into the bottom end opening of the case 51.

The slide member 52 is formed sealed on the lower side, and with an outer diameter formed in a cylindrical shape approximately equal to the inner diameter of the case 51. The case 51 supports the slide member 52 to allow vertical movement within a specified range and also so as not to move towards the circumference. The lower surface of the bottom wall of the slide member 52 is formed as a smooth surface serving as a slide-contact surface.

A compression coil spring (hereafter called "spring") 53 functioning as the member for applying a force is mounted in a compressed, deformed state between the case 51 and the slide member 52. The spring 53 applies a constant downward force to the slide member 52 as a reaction force on the case 51, or in other words the gear case cover 29. The spring 53 is positioned by a positioning projection 51a formed on the lower surface of the upper wall of the case 51 and by a positioning projection 52a formed on the upper surface of the bottom wall of the slide member 52.

A head section 38 is formed protruding on the top end surface of the tip of the first small-diameter gear 35. The head section 38 is formed in a circular ring shape with approximately a semi-oblong cross section. The compressed, deformed spring 53 presses the lower end surface serving as the slide-contact surface of the slide member 52 against the upper end surface of the head section 38. In other words the spring 53 in a compressed, deformed state, applies a resilient force as a reaction force on the gear case cover 29 to the first counter gear 30 to press it against the gear case 21.

In a state where the first device 50 and the second device 50' configured as described above, apply a resilient force while arranged between the gear case cover 29 and the tip of the small-diameter gear 35 of the first counter gear 30; and between the gear case cover 29 and the tip of the second small-diameter gear 35' of the second counter gear 30'; the second worm 15' and the second large-diameter gear 31' of the second counter gear 30' mesh in the vicinity of the tooth thickness 32'a on the gear case cover side to maintain a state where backlash is reduced when the wiper motor 10 is stopped.

The output gear 40 shown in FIG. 8A through FIG. 8E is described next.

Figure 8A:
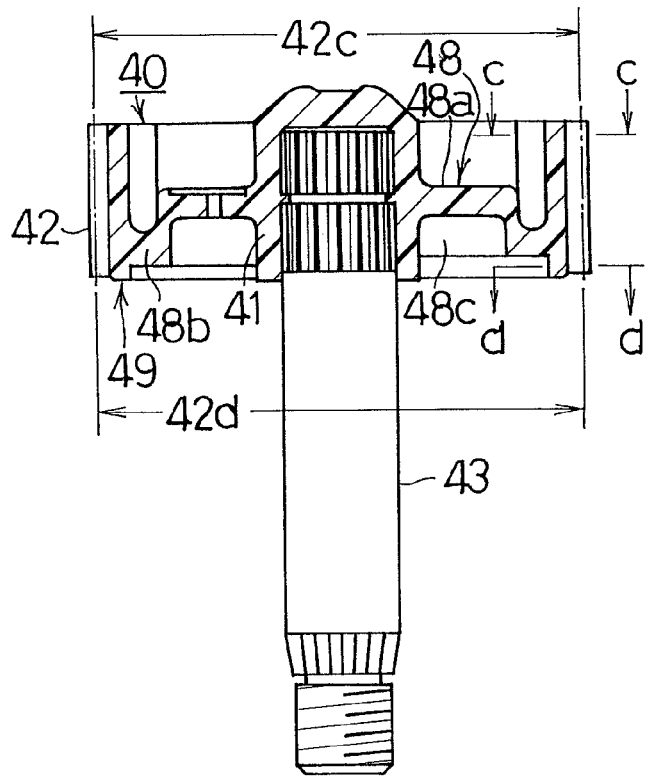
FIGS. 8A, 8B, 8C, 8D and 8E are drawings showing the output gear.
Figure 8C:
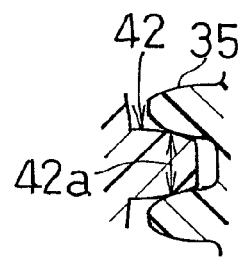
Figure 8D:
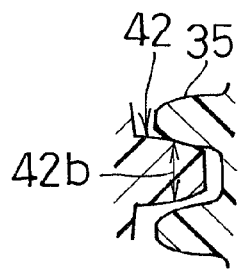
Figure 8B:
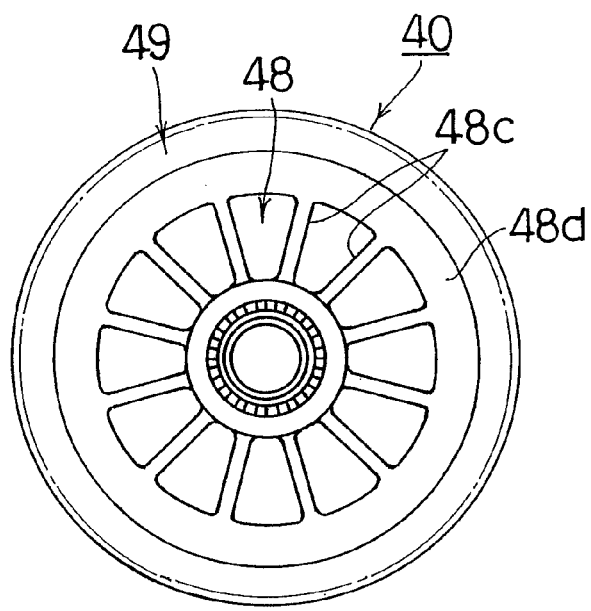

As shown in FIG. 8C and FIG. 8D, the teeth thickness 42a on the gear case cover 29 side of the teeth 42 of the output gear 40 is set to a larger thickness than the teeth thickness 42b on the gear case 21 side (bottom side of the gear case 21).

As shown in FIG. 8C, the increased portion on the teeth thickness 42a on the gear case cover side, is distributed to the back tooth surface of the teeth 42 (surface opposite the side on which the output gear and the small-diameter gear contact constantly when the wiper motor is rotating).

As shown in FIG. 8A, the output gear 40 contains a base 48 formed in disk shape, and an outer cylindrical section 49 formed vertically from the base 38 as one piece in a cylindrical shape. The base 48 is formed protruding concentrically on the outer circumference of the cylindrical section (hereinafter, called inner cylindrical section) 41 in the center of the output gear 40. The outer cylindrical section 49 is arranged concentrically on the outer circumference of the base 48. The teeth 42 on the output gear 40 that mesh with the teeth 36 on the second small-diameter gear 35' and the teeth 36 on the first small-diameter gear 35 are formed on the outer circumferential surface of the outer cylindrical section 49.

An inner end 48a of the base 48 is linked closer to the gear case 21 side (hereinafter, lower side) than the center height of the inner cylindrical section 41. A drooping section 48b is formed on the outer end of the base 48. The outer edge of the drooping section 48b is linked near the bottom edge of the outer cylindrical section 49.

The outer cylindrical section 49 is set with a tiny taper that becomes gradually larger from the lower edge side (gear case 21 side) towards the upper edge side (gear case cover 29 side). In other words, as shown in FIG. 8A, the outer cylindrical section 49 is slightly tilted so that the pitch circle 42c on the upper edge of the teeth 42 is slightly larger than the pitch circle 42d on the lower edge of the teeth 42.

Multiple ribs 48c are placed so as to radiate outwards on the lower side of the base 48, and formed protruding in a range from the outer circumference of the inner cylindrical section 41 to the inner circumference of the drooping section 48b. The height of each rib 48 is equivalent to the height of the drooping section 48b. Forming the multiple ribs 48c on the base 48 allows reinforcing the coupling between the output shaft and the inner cylindrical section 41.

The function and effect of the wiper motor 10 structured as related above are described next.

Turning on the switch on the motor control circuit causes electrical current to flow in the armature 16, etc. and causes the armature shaft 14 to rotate. The rotation force of the armature shaft 14 is conveyed to the output shaft 43 by way of the first worm 15 and second worm 15', the first large-diameter gear 31 and second large-diameter gear 31', the first small-diameter gear 35 and second small-diameter gear 35' and the output gear 40.

The rotation of the output shaft 43 converted to a swing motion by the wiper link 45 is conveyed to the wiper blade (not shown in the drawings). The wiper blade then wipes the window glass by a swing motion.

During transmission of the rotational force of the armature shaft 14 from the first worm 15 and the second worm 15' to the first large-diameter gear 31 and the second large-diameter gear 31', the direction of the thrust load generated due to the combination of the first worm 15 and the first counter gear 30 and the direction of the thrust load generated due to the combination of the second worm 15' and second counter gear 30' are opposite to each other and the thrust loads are canceled out.

A strong and accurate thrust bearing to support each of the counter gears 30, 30' for free rotation is in this way no longer needed. Moreover, there is no play in the armature shaft 14 of the wiper motor 10 and the armature 16 can rotate smoothly.

In this embodiment, a load is applied in a direction where each of the counter gears 30, 30' approaches the gear case cover 29 (direction towards the opening of the gear case) when the wiper motor 10 rotates. Arranging the first device 50 and the second device 50' in the gear case cover 29 can therefore suppress the contact between the head sections 38, 38 of each of the small-diameter gears 35, 35' and the gear case cover 29.

Moreover, compared to when the motor is stopped, a load is also applied in a direction towards the gear case cover 29 (direction towards the opening of the gear case), so that each of the counter gears 30, 30' is moved in proportion to that load in the direction where the first device 50 and the second device 50' maintain a backlash, or in other words a direction where the back tooth surfaces of each of the large-diameter gears 31, 31' separate from the tooth surfaces of each worm 15, 15'. The counter gears 30, 30' in this way mesh with the worms at a suitable position which serves to boost the efficiency of continuous operation of the wiper motor 10.

However, in contrast to the above, a so-called the inverse load from inertial force is applied to make the counter gears rotate in reverse when the wiper blade reverses during the swing motion so that the back tooth surface of the large-diameter gear on the counter gear colliding with the back tooth surface of the worm generates abnormal sounds.

In this embodiment, the tooth of the large-diameter gear has different leads on the front tooth surface side where the large-diameter gear teeth mesh with the first worm 15 and the second worm 15' and on the back tooth surface side, by making the tooth teeth thickness on the gear case cover side of the first teeth 32 of the first counter gear 30 and the second teeth 32' of the second counter gear 30' larger than the teeth thickness on the gear case bottom side. Therefore, by moving the first counter gear and the second counter gear to make the back tooth surfaces of the first counter gear and the second counter gear contact the back tooth surfaces of the first worm and the second worm via the inverse load from inertial force caused by reversal motion of the wiper blade, the abnormal noise generated when each of the large-diameter gears contacts each of the worms can be prevented.

In other words, in this embodiment, by moving the first counter gear and the second counter gear in the direction of the teeth thickness 32a on the gear case cover side of the first counter gear 30 so that the back tooth surfaces of the first counter gear and the second counter gear make contact with the back tooth surfaces of the first worm and the second worm due to the inverse load from inertial force generated during reversal motion of the wiper blade; and moving the first counter gear 30 in a direction where backlash with the first worm 15 is reduced; and further, by moving in the direction of the teeth thickness 32a' on the gear case cover side of the second counter gear 30'; and moving the second counter gear 30' in a direction where backlash with the second worm 15' is reduced, the generation of noise can be prevented so that the generation of abnormal noise accompanying the collision can be prevented beforehand.

Moreover, in this embodiment, the first device 50 is arranged between the tip of the first small-diameter gear 35 of the first counter gear 30 and the gear case cover 29, for applying a force to press the first counter gear 30 towards the gear case 21; and the second device 50' is arranged between the tip of the second small-diameter gear 35' of the second counter gear 30' and the gear case cover 29 to apply a force to press the second counter gear 30' towards the gear case 21; so that the back tooth surfaces of the first counter gear and the second counter gear can always mesh finely with the back tooth surfaces of the first worm and the second worm; and moreover, by moving in a direction where the backlashes of the first counter gear and the second counter gear are reduced by the inverse load from inertial force from the reversal motion of the wiper blade, the generation of sound by the first worm and the second worm can be reliably prevented to a yet further level.

The present embodiment can in other words, reliably prevent generation of the abnormal noise that accompanies the phenomenon where the first counter gear and the second counter gear strike the first worm and the second worm due to the inverse load caused by the inertial force from the reversal motion of the wiper blade.

Incidentally, in this embodiment, the teeth thickness 32a on the gear case cover side of the first large-diameter gear 31 is formed larger than the teeth thickness 32b on the gear case bottom side; and moreover the teeth thickness 32a' on the gear case cover side of the second large-diameter gear 31' is also formed larger than the teeth thickness 32b' on the gear case bottom side so that both the first large-diameter gear 31 and the second large-diameter gear 31' can be assembled from one side (gear case cover 29 side, upper side in FIG. 4B) onto the first worm 15 and the second worm 15' to improve the task of assembling the first counter gear 30 and the second counter gear 30' to the first worm 15 and the second worm 15'.

However, when the inverse load caused by the inertial force is applied to the counter gear to make the counter gear rotate in reverse when the wiper blade reverses during the swing motion, the back tooth surface of the tooth of the output gear collides with the back tooth surface of the small-diameter gear of the counter gear to cause abnormal sounds.

In this embodiment, along with setting the teeth thickness 42a on the gear case cover 29 side of the teeth 42 of the output gear 40 larger than the teeth thickness 42b on the gear case 21 side, the increased portion on the teeth thickness 42a on the gear case cover 29 side is distributed to the back tooth surface of the teeth 42 so that the teeth 36, 36 of the small-diameter gear 35, 35' contacting the teeth 42 are always in contact with the back tooth surface and the front tooth surface. The small-diameter gears 35, 35' and the output gear 40 are in this way able to constantly mesh in a state where backlash is reduced so that generation of abnormal sounds due to meshing can be suppressed.

Figure 8E:
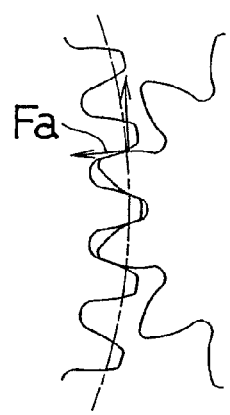

Moreover, as shown in FIG. 8C and FIG. 8D in the present embodiment, by setting the outer cylindrical section 49 of the output gear 40 with a tiny taper that gradually becomes larger from the lower edge (tip side of the output shaft) towards the upper edge (serration side of the output shaft), the component force Fa to contract the diameter of the upper edge section of the outer cylindrical section 49 of the output gear 40 occurs as shown in FIG. 8E, making the back tooth surfaces of the teeth 42 of the output gear 40 contact the back tooth surfaces of the small-diameter gears 35, 35' even more closely.

Also setting the connecting section that links the outer cylindrical section 49 with the drooping section 48b near the lower edge, can make the outer cylindrical section 49 deform towards the output shaft 43 (inner side of the outer cylindrical section) with that connecting section as the support when a force is generated on the upper edge side, or in other words the component force Fa as shown in FIG. 8E occurs.

In other words, in this embodiment, the teeth 36, 36 of the small-diameter gears 35, 35' that make contact with the teeth 42 constantly make contact with the front tooth surfaces and the back tooth surfaces, and a resilient force occurs on the outer cylindrical section. The output gear 40 and the small-diameter gears 35, 35' can in this way constantly mesh in a state where backlash is reduced so that the generation of sounds such as from play due to tooth meshing can be inhibited.

Incidentally, during molding of the output gear 40 by a molding die with the multiple ribs 48c radiating on the bottom side of the base 48, forming the ribs 48c allows occupying a greater surface area of the molding die, and the output gear 40 serving as the mold product can reliably remain on the lower mold on the rib 48c side so that a stable and suitable release of mold can be attained.

Figure 9A:
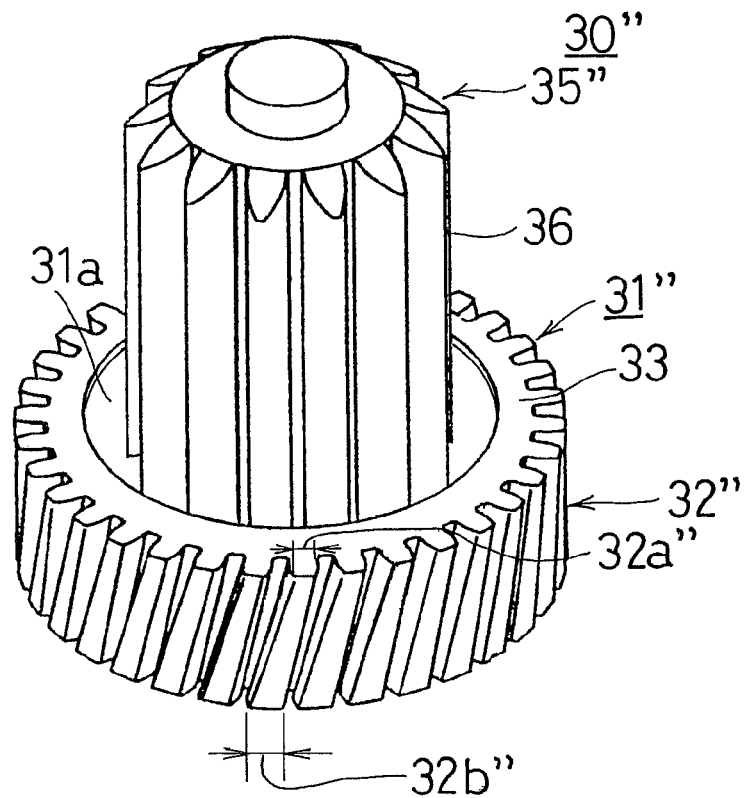
FIGS. 9A and 9B are drawings showing the motor with reduction gear mechanism of the second embodiment of the present invention.
Figure 9B:
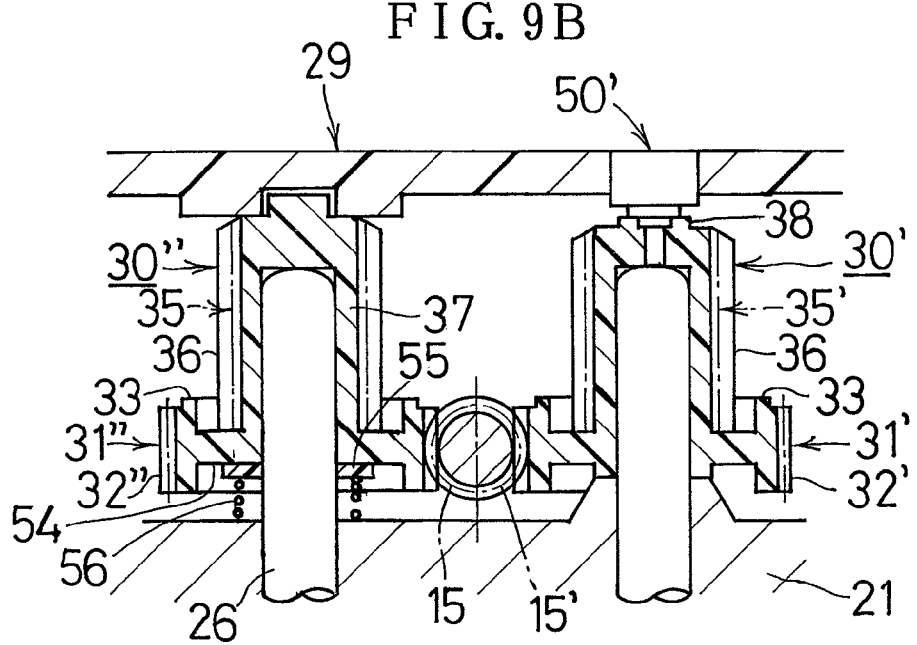

The second embodiment of the present invention is shown in FIGS. 9A and 9B.

The present embodiment differs from the previous embodiment in the points that the teeth thickness 32b" on the gear case bottom side of the first teeth of the first large-diameter gear 31" is formed larger than the teeth thickness 32a" on the gear case cover side, and that a storage recess 54 is formed on the end surface on the gear case 21 side of the first large-diameter gear 31", and that a circular ring shaped slide member 55 and a compression coil spring (hereinafter called spring) 56 are placed within the storage recess 54 so as to press the first counter gear 30" towards the gear case cover 29.

In the present embodiment, the leads applied to the back tooth surfaces of the first teeth teeth 32" of the first counter gear 30" and the second teeth 32' of the second counter gear 30' are in mutually opposite directions. Moreover, the spring 56 of the first large-diameter gear 31" is arranged so as to press the first counter gear 30" towards the gear case cover 29 so that the first counter gear 30" is pressed against the gear case cover 29 to reduce the backlash with the first worm 15 when the motor is stopped; and when the motor is operating, a load towards the gear case 21 is applied compared to when the motor is stopped, so that the first counter gear 30" is moved in proportion to that load in a direction where the spring 56 maintains a backlash or in other words, the direction where the back tooth surface of the first large-diameter gear 31" separates from the tooth surface of the first worm 15. Thus, the first counter gear 30" can mesh at a suitable position with the worm and boost the efficiency of continuous operation of the wiper motor 10.

When an inverse load from inertial force is generated due to reversal of the wiper blade, the first counter gear 30" moves in a direction that lowers the backlash between the first large-diameter gear 31" and the first worm 15.

The second counter gear 30' is structured such that a force is applied in the direction opposite to the case of the first counter gear 30" in this second embodiment, and has a structure identical to that in the above described first embodiment.

The embodiment can in this way reliably prevent the phenomenon in which the back tooth surfaces of the first counter gear and the second counter gear collide with the back tooth surfaces of the first worm and the second worm due to the inverse load from inertial force generated from reversal motion of the wiper blade.

The first large-diameter gear 31" of this embodiment incidentally is formed with the teeth teeth thickness 32b" on the gear case bottom side that is larger than the teeth thickness 32a" on the gear case cover side. Also, the second large-diameter gear 31' is formed in the same way as shown in FIG. 6C, with the teeth thickness 32a' on the gear case cover side that is larger than the teeth thickness 32b' on the gear case bottom side. Therefore, assembling the first counter gear 30" and the second counter gear 30' from one side (gear case cover 29 side) onto the first worm 15 and the second worm 15' is difficult.

However, the first counter gear 30" and the second counter gear 30' can be assembled onto the first worm 15 and the second worm 15' by mounting the armature shaft 14 onto the radial bearing after assembling the second large-diameter gear 31' of the second counter gear 30' onto the second worm 15' while tilting the armature shaft 14 relative to the rotating axis of the wiper motor, and then assembling the first large-diameter gear 31" of the first counter gear 30" onto the first worm 15.

Figure 10A:
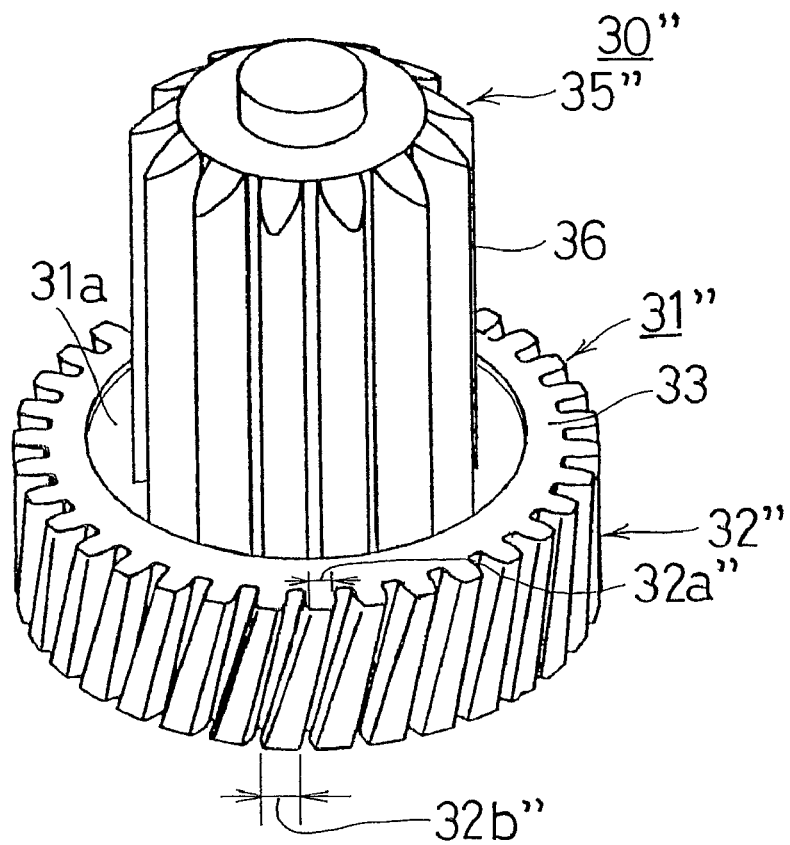
FIGS. 10A and 10B are drawings showing the motor with reduction gear mechanism of the third embodiment of the present invention.
Figure 10B:
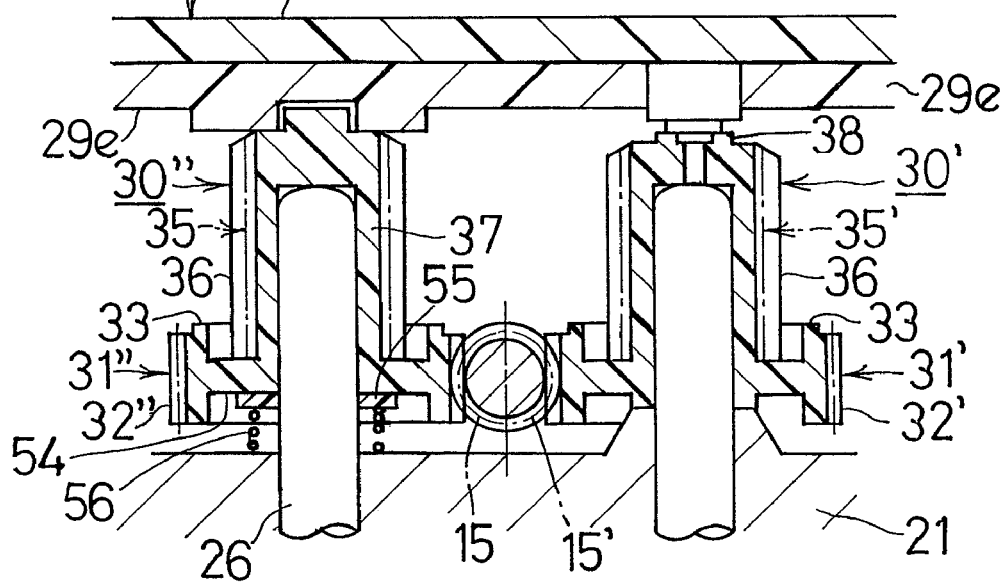

The third embodiment of the present invention is shown in FIGS. 10A and 10B.

As shown in FIG. 1, the open section 23a on one end side of the reduction gear mechanism storage section 23 of the gear case 21 is covered by the gear case cover 29 made from synthetic resin. The gear case cover 29 as shown in FIGS. 10A and 10B is made up of a synthetic resin gear case cover piece 29d, and an insulator 29e that is attached separately to the gear case cover piece 29d, and in which electrical wiring such as terminals are concentrated.

A coupler (not shown in drawing) is integrated into the gear case cover 29 as one piece. The coupler connects to an electrical connection in the vehicle. Turning on the wiper switch in the vehicle makes electrical current flow from the terminals to the brushes to rotate the wiper motor 10.

As shown in FIGS. 10A and 10B, the second device 50' containing the slide member 52 and the spring 56 is installed on the insulator 29e. The slide member 52 is mounted on the insulator 29e so as to move in the direction of expansion and contraction of the spring 56, and moreover so as not to move towards the circumference. The lower surface of the bottom sealed wall of the slide member 52 is formed smooth and constitutes a slide-contact surface that makes sliding contact with the head section 38 of the small-diameter gear 35'.

The third embodiment differs from the second embodiment only in the point that the slide member 52 is installed onto the insulator 29e which is one portion of the gear case cover. The shape of the first teeth formed on the first large-diameter gear of the first counter gear and the shape of the second teeth formed on the second large-diameter gear of the second counter gear are the same as disclosed in the second embodiment.

In the present embodiment, the leads applied to the back tooth surfaces of the first teeth teeth 32" of the first counter gear 30" and the second teeth 32' of the second counter gear 30' are in mutually opposite directions. Moreover, the spring 56 of the first large-diameter gear 31" is arranged so as to press the first counter gear 30" against the insulator 29e so that the first counter gear 30 is pressed against the insulator 29e to reduce the backlash with the first worm 15 when the motor is stopped; and when the motor is operating, a load towards the gear case 21 is applied compared to when the motor is stopped, so that the first counter gear 30" is moved in proportion to that load in a direction where the spring 56 maintains a backlash or in other words, the direction where the back tooth surface of the large-diameter gear 31" separates from the tooth surface of the first worm 15. The first counter gear 30" can therefore mesh at a suitable position with the worm and boost the efficiency of continuous operation of the wiper motor 10.

When an inverse load from inertial force is generated due to reversal motion of the wiper blade, the first counter gear 30" moves in a direction that lowers the backlash between the first large-diameter gear 31" and the first worm 15.

The second counter gear 30' is structured such that a force is applied in the direction opposite to the case of the first counter gear 30" in this third embodiment, and has a structure identical to that in the above described first embodiment.

The embodiment can in this way reliably prevent the phenomenon in which the back tooth surfaces of the first counter gear and the second counter gear collide with the back tooth surfaces of the first worm and the second worm due to the inverse load from inertial force generated from reversal motion of the wiper blade.

The first large-diameter gear 31" of the present embodiment incidentally is formed with the teeth thickness 32b" on the gear case bottom side that is larger than the teeth thickness 32a" on the gear case cover side. Further, the second large-diameter gear 31' is formed in the same way as shown in FIG. 6C, with the teeth thickness 32a' on the gear case cover side that is larger than the teeth thickness 32b' on the gear case bottom side. Therefore, assembling the first counter gear 30" and the second counter gear 30' from one side (gear case cover 29 side) onto the first worm 15 and the second worm 15' is difficult.

However, the first counter gear 30" and the second counter gear 30' can be assembled onto the first worm 15 and the second worm 15' by mounting the armature shaft 14 onto the radial bearing after assembling the second large-diameter gear 31' of the second counter gear 30' onto the second worm 15' while tilting the armature shaft 14 relative to the rotating axis of the wiper motor, and then assembling the first large-diameter gear 31" of the first counter gear 30" onto the first worm 15.

The present invention is not limited to the above described embodiments, and needless to say, various types of changes not departing from the spirit and scope of the present invention are allowed.

The actual structure of the first device and the second device for example is not limited to the above embodiments. Any structure may be utilized as long as the device for applying a force is capable of applying force to the counter gear by way of a slide member.

An undercut portion can be formed at the roots of the thickness section of the first teeth of the first large-diameter gear and the thickness section of the second teeth of the second large-diameter gear to make the thickness sections on the adjoining teeth interfere with each other.

Here, the undercut portion is the portion where the section surrounded with the involute curve, vicinity of the pitch circle, and the tooth bottom has been removed.

The motor with reduction gear mechanism described in the embodiments was utilized as a wiper motor for vehicles, however, the embodiments can also be applied to other motors with reduction gear mechanisms including powered seat motors and power window motors.

The invention claimed is:

1. A motor with reduction gear mechanism comprising:
    a yoke formed with a bottom and an opening on one end,
    a magnet fixed to the inner circumferential side of the yoke,
    an armature arranged on the inner side of the magnet,
    a rotating shaft fixed to the armature and including a first worm and a second worm having mutually opposite screw torsion directions,
    a gear case connected to the opening of the yoke and supporting the rotating shaft to allow free rotation and having a reduction gear mechanism storage section with a bottom to accommodate a reduction gear mechanism,
    a gear case cover to cover the opening of the gear case,
    a first counter gear with multiple first teeth having the teeth thickness on the gear case cover side of the first teeth larger than the teeth thickness on the gear case bottom side,
    a second counter gear with multiple second teeth having the teeth thickness on the gear case cover side of the second teeth larger than the teeth thickness on the gear case bottom side, and
    an output gear containing an output shaft and meshing with the first small-diameter gear and the second small-diameter gear.

2. A motor with reduction gear mechanism comprising:
    a yoke formed with a bottom and an opening on one end,
    a magnet fixed to the inner circumferential side of the yoke,
    an armature arranged on the inner side of the magnet,
    a rotating shaft fixed to the armature and including a first worm and a second worm having mutually opposite screw torsion directions,
    a gear case connected to the opening of the yoke and supporting the rotating shaft to allow free rotation and having a reduction gear mechanism storage section with a bottom to accommodate a reduction gear mechanism,
    a gear case cover to cover the opening of the gear case,
    a first counter gear with multiple first teeth having the teeth thickness on the gear case bottom side of the first teeth larger than the teeth thickness on the gear case cover side,
    a second counter gear with multiple second teeth having the teeth thickness on the gear case cover side of the second teeth larger than the teeth thickness on the gear case bottom side, and
    an output gear containing an output shaft and meshing with the first small-diameter gear and the second small-diameter gear.

3. The motor with reduction gear mechanism according to claim 1, wherein a first device for applying a force is arranged between the tip of the first small-diameter gear and the gear case cover to apply a force so as to press the first counter gear towards the gear case; and a second device for applying a force is arranged between the tip of the first small-diameter gear and the gear case cover to apply a force so as to press the second counter gear towards the gear case.

4. The motor with reduction gear mechanism according to claim 2, wherein a first device for applying a force is arranged between the end of the first large-diameter gear and the gear case to apply a force so as to press the first counter gear towards the gear case cover; and a second device for applying a force is arranged between the tip of the second small-diameter gear and the gear case cover to apply a force so as to press the second counter gear towards the gear case.

5. The motor with reduction gear mechanism according to claim 1, wherein the lead of the front tooth surface meshing with the first worm at the tooth of the first large-diameter gear, and the lead of the back tooth surface on the side opposite the front tooth surface are different leads in the direction of the tooth trace.

6. The motor with reduction gear mechanism according to claim 1, wherein the lead of the front tooth surface meshing with the second worm at the tooth of the second large-diameter gear, and the lead of the back tooth surface on the side opposite the front tooth surface are different leads in the direction of the tooth trace.

7. The motor with reduction gear mechanism according to claim 1, wherein the first device for applying a force and the second device for applying a force respectively contain a coil spring.

8. The motor with reduction gear mechanism according to claim 1, wherein the second device for applying a force is comprised of the coil spring, and a slide member to which a force is applied by the coil spring and that is installed at the gear case cover.

9. The motor with reduction gear mechanism according to claim 1, wherein an undercut portion is formed on the root of the tooth on the thickness section of the tooth on the first large-diameter gear, and an undercut portion is formed on the root of the tooth on the thickness section of the tooth on the second large-diameter gear.

10. A motor with reduction gear mechanism comprising:
a yoke formed with a bottom and an opening on one end,
a magnet fixed to the inner circumferential side of the yoke,
an armature arranged on the inner side of the magnet,
a rotating shaft fixed to the armature and including a first worm and a second worm having mutually opposite screw torsion directions,
a gear case connected to the opening of the yoke and supporting the rotating shaft to allow free rotation and having a reduction gear mechanism storage section with a bottom to accommodate a reduction gear mechanism,
a gear case cover to cover the opening of the gear case,
a first counter gear with multiple first teeth having the teeth thickness of the first teeth formed gradually larger from the gear case cover side towards the gear case bottom,
a second counter gear with multiple second teeth having the teeth thickness of the second teeth formed gradually larger from the gear case bottom side towards the gear case cover, and
an output gear containing an output shaft and meshing with the first small-diameter gear and the second small-diameter gear.

11. A motor with reduction gear mechanism comprising:
a yoke formed with a bottom and an opening on one end,
a magnet fixed to the inner circumferential side of the yoke,
an armature arranged on the inner side of the magnet,
a rotating shaft fixed to the armature and including a first worm and a second worm having mutually opposite screw torsion directions,
a gear case connected to the opening of the yoke and supporting the rotating shaft to allow free rotation and having a reduction gear mechanism storage section with a bottom to accommodate a reduction gear mechanism,
a gear case cover to cover the opening of the gear case,
a first counter gear with multiple first teeth having the teeth thickness of the first teeth formed gradually larger from the gear case bottom side towards the gear case cover,
a second counter gear with multiple second teeth having the teeth thickness of the second teeth formed gradually larger from the gear case bottom side towards the gear case cover, and
an output shaft and meshing with the first small-diameter gear and the second small-diameter gear.

12. The motor with reduction gear mechanism according to claim 10, wherein a first device for applying a force is arranged between the end of the first large-diameter gear and the gear case to apply a force so as to press the first counter gear towards the gear case cover; and a second device for applying a force is arranged between the tip of the second small-diameter gear and the gear case cover to apply a force so as to press the second counter gear towards the gear case.

13. The motor with reduction gear mechanism according to claim 11, wherein a first device for applying a force is arranged between the tip of the first small-diameter gear and the gear case cover to apply a force so as to press the first counter gear towards the gear case; and a second device for applying a force is arranged between the tip of the first small-diameter gear and the gear case cover to apply a force so as to press the second counter gear towards the gear case.

14. The motor with reduction gear mechanism according to claim 10, wherein the lead of the front tooth surface meshing with the first worm at the tooth of the first large-diameter gear, and the lead of the back tooth surface on the side opposite the front tooth surface are different leads in the direction of the tooth trace.

15. The motor with reduction gear mechanism according to claim 10, wherein the lead of the front tooth surface meshing with the second worm at the tooth of the second large-diameter gear, and the lead of the back tooth surface on the side opposite the front tooth surface are different leads in the direction of the tooth trace.

16. The motor with reduction gear mechanism according to claim 10, wherein the first device for applying a force and the second device for applying a force respectively contain a coil spring.

17. The motor with reduction gear mechanism according to claim 10, wherein the second device for applying a force is comprised of the coil spring, and a slide member to which a force is applied by the coil spring and that is installed at the gear case cover.

18. The motor with reduction gear mechanism according to claim 10, wherein an undercut portion is formed on the root of the tooth on the thickness section of the tooth on the first large-diameter gear, and an undercut portion is formed on the root of the tooth on the thickness section of the tooth on the second large-diameter gear.

19. A motor with reduction gear mechanism comprising:
a yoke formed with a bottom and an opening on one end,
a magnet fixed to the inner circumferential side of the yoke,
an armature arranged on the inner side of the magnet, a rotating shaft fixed to the armature and including a worm,
a gear case connected to the opening of the yoke and supporting the rotating shaft to allow free rotation and having a gear storage section with a bottom,
a gear case cover to cover the opening of the gear case, and
a gear with multiple teeth meshing with the worm having the teeth thickness of the teeth formed gradually larger from the gear case cover side towards the gear case bottom.

20. A motor with reduction gear mechanism comprising:
a yoke formed with a bottom and an opening on one end,
a magnet fixed to the inner circumferential side of the yoke,
an armature arranged on the inner side of the magnet,
a rotating shaft fixed to the armature and including a worm,
a gear case connected to the opening of the yoke and supporting the rotating shaft to allow free rotation and having a gear storage section with a bottom,
a gear case cover to cover the opening of the gear case, and
a gear with multiple teeth meshing with the worm having the teeth thickness of the teeth formed gradually larger from the gear case bottom side towards the gear case cover.

* * * * *